Patented Oct. 6, 1931

1,825,655

UNITED STATES PATENT OFFICE

JOAQUIN JULIO DE LA ROZA, SR., OF TUINUCU, CUBA

METHOD OF MANUFACTURING CELLULOSE

No Drawing.   Application filed October 16, 1928. Serial No. 312,936.

This invention relates to a method of manufacturing cellulose for all uses to which such material may be put, and has for an object to provide for the production of soft, strong, fibrous material, adapted for use in various manufactures, the said material being produced from vegetable substances containing cellulose, and particularly from sugar cane fiber.

Another object consists in providing such a method whereby vegetable substances may be given a first treatment, then stored, and then given subsequent treatment leading to the desired product, without any deterioration of or spontaneous injury to the substance during storage.

Another object consists in providing such a method whereby vegetable substances may be given a treatment of an acid nature, though it may include a base, and a subsequent treatment which includes a base whether the subsequent treatment be of an acid or alkaline nature, and with or without a washing step intermediate the first and second treatment.

Another object consists in providing such a method in which, by variation of the above named subsequent treatment, the character of the product may be altered.

Another object consists in providing certain improvements in the method whereby advantageous results are obtained.

Although this method is particularly applicable to the manufacture of cellulose from sugar cane fiber, it is also adapted to be employed in the production of cellulose from any cellulose bearing plant, and it is of substantial importance in connection with manufacture when conditions require the material to be stored after it has been cut from the growing state and before it can be fully processed in manufacture. In this last connection, my method provides a first treatment which so conditions the vegetable substances that they may be stored for a period of from a day to several months, or more, without deterioration, for instance by fungus growth; and without danger of injury as, for instance, by spontaneous combustion.

It is my belief that I have devised a method of producing a very pure cellulose which is very strong and is high in alpha content as well as in other distinctive characteristics of the best grade of this product; which method is commercially economical and practicable and preserves the native strength of the fibrous element of the vegetable substances, but obviates difficulties and disadvantages which have been prevalent in connection with many prior methods, especially in respect to the treatment of sugar cane fiber. The cellulose product of this method is well adapted for the manufacture of paper, paper board, explosives, artificial silk, photographic films, pyroxylin products, cotton substitutes, absorbents and analogous products.

It is well known that the manufacture of sugar from cane is commonly accompanied by a treatment for the separation of the sugar juices from the fibrous part of the cane as, for instance, by crushing between rollers or treatment in diffusers, and that this industry thus supplies a very large amount of the fibrous material which is commonly very inefficiently employed, if used at all. My method is adapted to the treatment of this material for obtaining the high grade product above set forth, and the invention will be herein described specifically in connection with the treatment of sugar cane fiber.

The method which forms the subject matter of this invention comprehends, in its preferred form, subjecting the sugar cane fiber first to a treatment with a dilute aqueous sulphurous acid solution; secondly, to a washing with water, preferably hot; thirdly to a treatment with a hot dilute aqueous solution that includes a base. In some cases the washing is unnecessary and may be omitted.

The first, or sulphurous acid treatment, removes, or transforms so as to nullify their injurious effects, the sucrose, invert and other sugars, pentosans, and similar carbohydrates, coloring matters and the like; as well as various fungi and other growths that prey upon the incrusting materials of the vegetable substances. This renders the material suitable for application of the subsequent treatments in the method, and also renders it suitable for storage without danger of deterioration or spontaneous injury. The second, or washing treatment, if employed, removes such materials as are in condition for solution or separation by the water at that stage of the method. The third, or treatment including a base, renders soluble the various substances contained in the fibrous material which remain after the sulphurous acid treatment and washing, whereby they are easily removable by the usual subsequent steps of washing, bleaching, etc., commonly practiced in the treatment of pulp in the paper industry.

In following a preferred manner of carrying out my invention, the sugar cane fiber as obtained fresh from the crushing rollers or diffusers, which is in excellent condition for this treatment owing to its freshness, is conveyed by means of blowers or other suitable contrivance, to apparatus, such as combing and screening devices, for the purpose of separating the dirt and dust-like or short and fibrous material, commonly known as pith, from the longer and stronger fibrous material forming the exterior portions of the cane. The long and strong fibers are then washed, preferably with hot water, for the purpose of removing sugars and other water soluble materials that remain even after the original crushing or diffusing. The water used for washing may then be separated from the fiber as, for instance, by pressure.

The next procedure, which should be effected promptly after the fiber is obtained from the rollers or diffusers, is the dilute aqueous sulphurous acid treatment which may be carried out by adding to the fibrous material a solution of sulphurous acid as, for instance, by spraying the same on the material or immersing the material in such a solution contained in a vat or mixer or the like at atmospheric pressure. The strength and temperature of solution employed may vary in accordance with conditions, and the action at any given temperature and time of treatment will be substantially in proportion to the amount of sulphurous acid as compared with the bone dry weight of the fiber. A treatment with a dilute aqueous solution containing one half of one percent $SO_2$, based on the bone dry weight of the sugar cane fiber, and warmed to a maximum temperature of about 80° C., conducted for a period of time sufficient to thoroughly impregnate the fibers, say six hours or more, is adequate in connection with the manufacture of a very high quality of cellulose. Again, a treatment with a dilute aqueous solution containing approximately four or five percent $SO_2$, based on the bone dry weight of the sugar cane fiber, and conducted at a maximum temperature of approximately 80° C., for a period of time sufficient to thoroughly impregnate the fibers, say from a few minutes to one hour or more, is adequate in connection with the manufacture of a high grade of cellulose. I prefer a treatment with a dilute aqueous sulphurous acid solution containing from two to five percent $SO_2$ based on the bone dry weight of the sugar cane fiber, conducted at atmospheric pressure for such period as the fiber may be in storage prior to the subsequent treatment with a solution containing a base as hereinafter described, which period may be from a few days to several months.

If desired, the fiber may be successively treated with acid solutions of progressively increasing concentration until it has absorbed the intended percentage of $SO_2$ based upon the bone dry weight of the fiber.

It may be stated that I prefer to employ sulphurous acid of such concentration that it may be handled commercially throughout the various steps of manufacture of acid from sulphur or other sulphur containing material, and treatment of the vegetable matter, with a minimum of discomfort to the operatives and chemical effect on the equipment but which is sufficiently strong to effect the desired results within a reasonable time. The concentration above named answers these requirements.

After the material has thus been impregnated (sugar cane fiber absorbs without dripping many times its weight of liquids) the material is not only prepared for the subsequent steps of the process, but it is also in condition for storing either in the open, or baled, or in any other approved manner, because the action of the sulphurous acid prevents, for example, the growth of fungi that would tend to consume not only the pectinous and other incrusting substances but would also attack the cellulose itself. Likewise, the action of the sulphurous acid tends to prevent fires arising from spontaneous combustion or accident, as well as to prevent destruction by slow or rapid oxidation, because of the reducing atmosphere generated by the sulphur dioxide. Accordingly, the material may, following the sulphurous acid treatment, either be passed to the next step of the process or be placed in storage and subsequently subjected to the succeeding steps of the process at such time as manufacturing requirements dictate, whether it be a matter of days or a matter of months following the sulphurous acid treatment. If the material is to be stored, as above suggested, it may be completely immersed in the said sulphurous acid solution contained in large vats or the like built of reinforced concrete properly protected against the chemical reaction, or of other suitable material; and, if climatic conditions require, the said vats could be provided with heating coils or the like, in order to maintain the intended temperature during cold weather. When it is desired to remove the material from the vats for subequent treatment, this can be done with bucket cranes, or other proper apparatus, composed of such material as to resist acid action or suitably protected, as by chromium or cadmium plating, against acid action.

In many cases, on the other hand, it will be found satisfactory to impregnate the material with the dilute aqueous acid solution by spraying or the like, and then store the material in the open, occasionally re-spraying the surface to compensate for drying.

The next step of the process, which may be carried out immediately after the first step or upon withdrawing the material from storage, is to thoroughly wash the charge, preferably with hot water. This washing is very effectively carried out by placing the charge in a washer of the vacuum type in which the operation is such as to suck or draw the water through the mass of fibers. As previously mentioned, there are apt to be occasions when, because of the nature of the material, this washing would be unnecessary and could be dispensed with.

After the washing has been completed, or after the sulphurous acid treatment has been completed, as the case may be, the fibrous charge is preferably immersed in a dilute aqueous solution that may, for instance, include eighteen to twenty-five per cent of alkali, such as potassium or sodium hydroxide, or sulphate liquor or sodium monosulphite, based on the bone dry dry weight of the fiber. Or the solution may consist of bisulphite of calcium or other bisulphite of varying proportions of free and combined acid, according to the quality of product desired.

Where a solution that is to be recovered by concentration is used, such as soda or sulphate, there should be sufficient only to equal about four times the bone dry weight of the charge, so that the subsequent draining may take place in a short period of time and the charge act after the manner of that which is known in this industry as "fast stock," and so that the subsequent recovery of chemical will be much more economical due to the higher concentration. This amount of solution will not completely cover the charge at the outset but it will do so after the charge has wilted, which action takes place quite rapidly. In case an acid bisulphite solution is used, it is preferable to completely cover the charge. In either case, the material is placed in a vessel suitable for treatment at elevated temperature and pressure. This vessel is preferably composed of ferric material, such as steel or iron, lined with brick adapted to resist the chemical action of the contents. This character of brick is well known to the chemical industry, although, where an alkaline reagent such, for instance, as sodium hydroxide is used, it should differ from the brick employed in the standard sulphite pulp digesters in that the latter are specially designed to withstand acid action only. In this case a specially hard burned silica brick is satisfactory.

The same effect in lining the vessel may be obtained in other ways as, for example, by plating the same with chromium or cadmium. The arrangement of valves, vents, and the like, may differ to a certain extent from the standard arrangement of the sulphite digesters, but such changes are well within the skill of the calling and merely for the purpose of better adapting the apparatus to the specific conditions in hand. It should be stated, however, that the said fittings should be composed of material which is resistant to the chemical reactions involved, or be so treated as to make them resistant thereto.

After the charge of fiber and solution containing a base has been passed into this vessel the valves, vents, openings, and the like, are closed, steam is applied and the contents heated to a temperature of from approximately 140° to 170° centigrade, and maintained at said temperature for a period of from one to twelve or more hours, depending on the reagents used. The time of treatment will, of course, vary in relation to the reagents used, strength of the solution and temperature employed, and it may also be varied to comply with the dictates of particular conditions in hand or objects desired.

The sodium hydroxide solution above described is suitable for the production of a high grade alpha cellulose but, if a product of less purity, but of great strength and flexibility, is desired, salt cake sodium sulphate liquor may be substituted for the sodium or potassium hydroxide, or various other mixtures of sodium hydroxide and sodium sulphide may be employed, or calcium bisulphite may be used.

In either case, this treatment including a base does not compare in intensity with the treatment commonly employed in the manufacture of pulp from wood; but it is not necessary to employ any such intense treatment because the first, or sulphurous acid treatment, especially if coupled with the subsequent washing, will remove so much of the incrusting materials from the fiber that the step which includes a base may be adequately performed with economy of chemical and moderate attendant conditions.

After the charge has been submitted to the treatment containing the base for the desired period of time, it is blown from the vessel into a pit or other container, and thereafter washed in a suitable manner with water, bleached and otherwise finally treated, all as is well understood in this art. It will be found that the amount of bleach required will be unusually low and that the product will have unusual strength and other desired qualities, such as softness and pliability, while the yield will be substantially increased.

It should be stated that, although I have described above the separation of the long fibers, and their treatment, the process, or method, is also applicable to the treatment of the whole of the fiber, without such separation, and, also, that the separation may take place and the short fibers be treated instead of the long.

It will be seen from the foregoing that my method avoids intense acid or alkaline treatment, thereby eliminating the disadvantages of many earlier processes, and consequently promoting economy and improving the quality of the product.

Again, it should be noted that neither the acid treatment nor the treatment including the base would, individually, be sufficient to obtain the product desired from sugar cane fiber; and that the dilute sulphurous acid treatment effects only partial solution or transformation of the incrusting matters and similar substances contained in the cane, while the treatment including the base which is much less intense in strength of chemical, time and temperature than the usual alkaline or acid processes employed in the treatment of wood, accomplishes, following the intermediate washing, or, in some cases, without intermediate washing, the complete reaction which is desired in order to render the remaining substances easily removable from the cellulose by the final washing and light bleaching.

It is an important advantage of this invention that the first, or dilute sulphurous acid treatment, especially when followed by washing, brings the charge to such a condition that it can be subsequently treated or cooked in any well known or approved solution including a base so as to produce an extremely strong and satisfactory cellulose material, whether the said solution including a base be of alkaline or acid reaction.

I may mention that sugar cane fiber contains substances which are soluble in alkali but are precipitated by acid, as well as substances which are soluble in acid but are precipitated by alkali. If the cane fiber is treated first with alkali and then with acid, the substances precipitated by the acid treatment are more undesirable than those precipitated by the alkali if the order of the said treatments is reversed.

If the cane fiber is treated with alkali and acid simultaneously, without the above pretreatment with acid, as would be the case if an attempt were made to produce cellulose from sugar cane fiber by the sulphite process ordinarily employed in connection with wood, or adaptations of said process involving the use of one or more bases, the fiber will not pulp satisfactorily and the desired product will not be obtained.

Owing to the fact that the sulphurous acid treatment, followed by washing, preferably with hot water, substantially effects the removal of most of the coloring matters, of most of the ferrous material (by forming soluble ferrous salts), and of the sucrose and other similar compounds and carbohydrates, thereby leading to a pliable and strong cellulose, the material is in excellent condition for the production of commercial cellulose by even a very mild treatment containing a base. Thus, it is possible to employ the solution containing a base above described at a temperature less than 100° centigrade and at atmospheric pressure; after which the fibrous material may be washed and treated in a rod mill or Pebble refiner, or ball mill or Jordan, or similar apparatus, which will separate the fibers and produce a cellulose suitable for various purposes although not of high purity. Such material, for instance, might well be adapted for the manufacture of news print, or board.

It is a feature of this invention that there may readily be a substantial recovery of chemicals used, particularly the sodium oxide and sulphur dioxide. The impracticability or impossibility of recovering some of the chemicals used has been an extremely serious drawback in prior methods calculated to produce this quality of cellulose.

In this description I have used the word "base" in its broad sense, intending to mean either a simple base, such as calcium or sodium; or an alkali, such as sodium hydroxide; or an alkali, such as sodium hydroxide, that has been changed into a salt.

Though I have mentioned treating sugar cane fiber resulting from cane which has been put through the usual processes for extracting the sugar, it is an advantage of this invention that I may utilize fiber obtained from sugar cane which has been damaged with respect to its adaptability for the manufacture of sugar, as, for instance, by fires in the field. Such damaged sugar cane, even though it may be unsuitable for the production of sugar, is well adapted for treatment by my above described method whereby the uninjured fibers can be separated and the intended product obtained. Furthermore, as above indicated, this method is adaptable to the treatment of other vegetable substances containing cellulose fibers, in addition to the fiber of sugar cane, such, for instance, as corn-stalks, wheat and other straws, etc. Thus, when, in the claims, I refer to vegetable fiber, I intend to cover the employment of such fiber in any form or condition suitable for the application of my method.

It will be understood that various changes may be resorted to in the steps of the process, in the materials, and in the apparatus, without departing from the spirit and scope of my invention; and hence, I do not intend to be limited to the details herein set forth except as they may be included in the claims.

What I claim is:

1. A method of treating vegetable fiber to produce cellulose, which includes, treating the fiber with a dilute sulphurous acid solution and, subsequently, treating the fiber with a solution that includes a base and is of an acid reaction.

2. A method of treating vegetable fiber to produce cellulose which includes, treating the fiber with a dilute sulphurous acid solution, washing the fiber, and, subsequently, treating the fiber with a solution that includes a base and is of an acid reaction.

3. A method of treating vegetable fiber to produce cellulose, which includes, impregnating the fiber with a dilute solution of an acid reaction, storing the impregnated fiber, treating the surface of the stored fiber with a dilute solution of an acid reaction and, subsequently, treating the fiber with a solution that includes a base.

4. A method of treating vegetable fiber to produce cellulose, which includes, impregnating the fiber with a dilute solution of an acid reaction, storing the impregnated fiber, treating the surface of the stored fiber with a dilute solution of an acid reaction and, subsequently, treating the fiber with a solution that includes a base and is of an acid reaction.

5. A method of treating vegetable fiber to produce cellulose, which includes, impregnating the fiber with a dilute solution of an acid reaction that includes a base, storing the impregnated fiber, treating the surface of the stored fiber with a dilute solution of an acid reaction, and, subsequently, treating the fiber with a solution that includes a base and is of an acid reaction.

In testimony that I claim the foregoing as my invention, I have signed my name this 15th day of October, 1928.

JOAQUIN JULIO de la ROZA, Sr.